United States Patent
Saha et al.

(10) Patent No.: US 11,230,161 B2
(45) Date of Patent: Jan. 25, 2022

(54) DYNAMIC FAN SPEED CONTROL FOR AERODYNAMIC DRAG REDUCTION

(71) Applicant: Cummins Inc., Columbus, IN (US)

(72) Inventors: Rohit Saha, Columbus, IN (US); Long K. Hwang, Columbus, IN (US)

(73) Assignee: Cummins Inc., Columbus, IN (US)

( * ) Notice: Subject to any disclaimer, the term of this patent is extended or adjusted under 35 U.S.C. 154(b) by 27 days.

(21) Appl. No.: 16/824,183

(22) Filed: Mar. 19, 2020

(65) Prior Publication Data

US 2020/0215875 A1 Jul. 9, 2020

Related U.S. Application Data

(62) Division of application No. 16/168,340, filed on Oct. 23, 2018, now Pat. No. 10,647,175.

(60) Provisional application No. 62/585,666, filed on Nov. 14, 2017.

(51) Int. Cl.
*B60K 11/00* (2006.01)
*B60H 1/00* (2006.01)
*B60K 11/06* (2006.01)
*F01P 7/04* (2006.01)

(52) U.S. Cl.
CPC ..... *B60H 1/00764* (2013.01); *B60H 1/00821* (2013.01); *B60H 1/00878* (2013.01); *B60K 11/06* (2013.01); *F01P 7/042* (2013.01); *F01P 7/048* (2013.01)

(58) Field of Classification Search
CPC .... B60K 11/00; B60K 11/06; B60H 1/00764; B60H 1/00821; B62D 35/00; B62D 35/001; B62D 35/02

USPC ....................................................... 180/68.1
See application file for complete search history.

(56) References Cited

U.S. PATENT DOCUMENTS

| | | | |
|---|---|---|---|
| 4,384,630 A | 5/1983 | Steiner | |
| 4,539,943 A | 9/1985 | Tsuchikawa et al. | |
| 6,729,844 B2 * | 5/2004 | Bettencourt | F04D 29/362 416/1 |
| 7,121,368 B2 * | 10/2006 | MacKelvie | B60K 11/00 180/68.1 |

(Continued)

FOREIGN PATENT DOCUMENTS

| CN | 101633381 | | 1/2010 |
| CN | 101870241 A | | 10/2010 |

(Continued)

OTHER PUBLICATIONS

Office Action and search report, CN Appln. Serial No. 201811353646.2, dated Sep. 28, 2021, 14 pgs.

*Primary Examiner* — Hau V Phan
(74) *Attorney, Agent, or Firm* — Taft Stettinius & Hollister LLP (57) ABSTRACT

A method, system, and apparatus are provided for optimizing control of the rotational speed of a fan in a vehicle so as to reduce the aerodynamic drag of a vehicle in a given operating parameter, and accordingly, to improve fuel efficiency of operation of the vehicle. Certain exemplary embodiments include determining an optimized speed of rotation of a cooling fan of the vehicle for reducing overall fuel demand in given operating conditions, and controlling rotation speed of the fan at the optimized speed in order to minimize fueling demand of a prime mover of the vehicle.

10 Claims, 6 Drawing Sheets

(56) References Cited

U.S. PATENT DOCUMENTS

| | | | |
|---|---|---|---|
| 7,237,827 B2 * | 7/2007 | Shahbazi | B62D 35/00 296/180.1 |
| 8,104,435 B2 | 1/2012 | Schwartz et al. | |
| 8,162,086 B2 * | 4/2012 | Robinson | F04D 27/002 180/68.1 |
| 8,196,993 B2 * | 6/2012 | Smith | B62D 35/001 296/180.3 |
| 8,442,752 B2 | 5/2013 | Wijaya et al. | |
| 8,479,853 B2 * | 7/2013 | Verbrugge | F01P 11/10 180/68.2 |
| 8,496,285 B2 * | 7/2013 | Rogers | B62D 35/001 296/180.1 |
| 8,544,583 B2 * | 10/2013 | Ajisaka | B62D 35/02 180/68.1 |
| 8,667,931 B2 | 3/2014 | Kerns | |
| 8,950,531 B2 | 2/2015 | Smith | |
| 8,967,311 B2 * | 3/2015 | Smith | B62D 35/001 180/68.2 |
| 9,610,835 B2 | 4/2017 | Nam et al. | |
| 9,664,104 B2 | 5/2017 | Glugla et al. | |
| 2008/0150321 A1 | 6/2008 | Neale | |
| 2010/0083917 A1 | 4/2010 | Saida et al. | |
| 2013/0158828 A1 * | 6/2013 | McAlister | C01B 3/22 701/70 |
| 2015/0240700 A1 * | 8/2015 | Nagahama | F01P 5/043 123/41.11 |
| 2015/0315955 A1 | 11/2015 | Nam et al. | |
| 2016/0040587 A1 | 2/2016 | Hoff et al. | |
| 2016/0214460 A1 | 7/2016 | Errick | |

FOREIGN PATENT DOCUMENTS

| | | |
|---|---|---|
| CN | 103790692 | 5/2014 |
| CN | 105082984 A | 11/2015 |
| FR | 2613682 | 10/1988 |

* cited by examiner

DYNAMIC FAN SPEED CONTROL FOR AERODYNAMIC DRAG REDUCTION

CROSS-REFERENCE TO RELATED APPLICATION

The present application is a divisional of U.S. patent application Ser. No. 16/168,340 filed on Oct. 23, 2018, which claims the benefit of the filing date of U.S. Provisional Application Ser. No. 62/585,666 filed on Nov. 14, 2017, which is incorporated herein by reference in its entirety.

BACKGROUND

The present application generally relates to dynamic control of cooling fan speed in a vehicle equipped with a prime mover, providing a method, an apparatus, and a system for reducing aerodynamic drag of vehicles by optimizing fan speed. A number of methods, systems, and apparatus have been developed for reducing the aerodynamic drag of vehicles in order to improve their fuel efficiency. However, such developments continue to suffer from a number of limitations and shortcomings, including complexity in operation or design, costly construction or implementation, and lack of interchangeability among different vehicle configurations. Therefore, a significant need remains for further improvements in systems, apparatus, and methods for reducing aerodynamic drag.

DISCLOSURE OF ILLUSTRATIVE EMBODIMENTS

For the purposes of clearly, concisely and exactly describing illustrative embodiments of the present disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY OF THE DISCLOSURE

Embodiments disclosed herein include a unique system, method, and apparatus that optimizes control of the rotational speed of a fan in a vehicle in a manner that is effective to reduce the aerodynamic drag of a vehicle, and accordingly to improve fuel efficiency of operation of the vehicle. Certain exemplary embodiments include unique methods, apparatuses, and systems for determining an optimized speed of rotation of a cooling fan of the vehicle for reducing overall fuel demand in given operating conditions, and controlling rotation speed of the fan at the optimized speed in order to minimize fueling demand of a prime mover of the vehicle by improving an aerodynamic drag characteristic of the vehicle. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DETAILED DESCRIPTION OF ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 1:
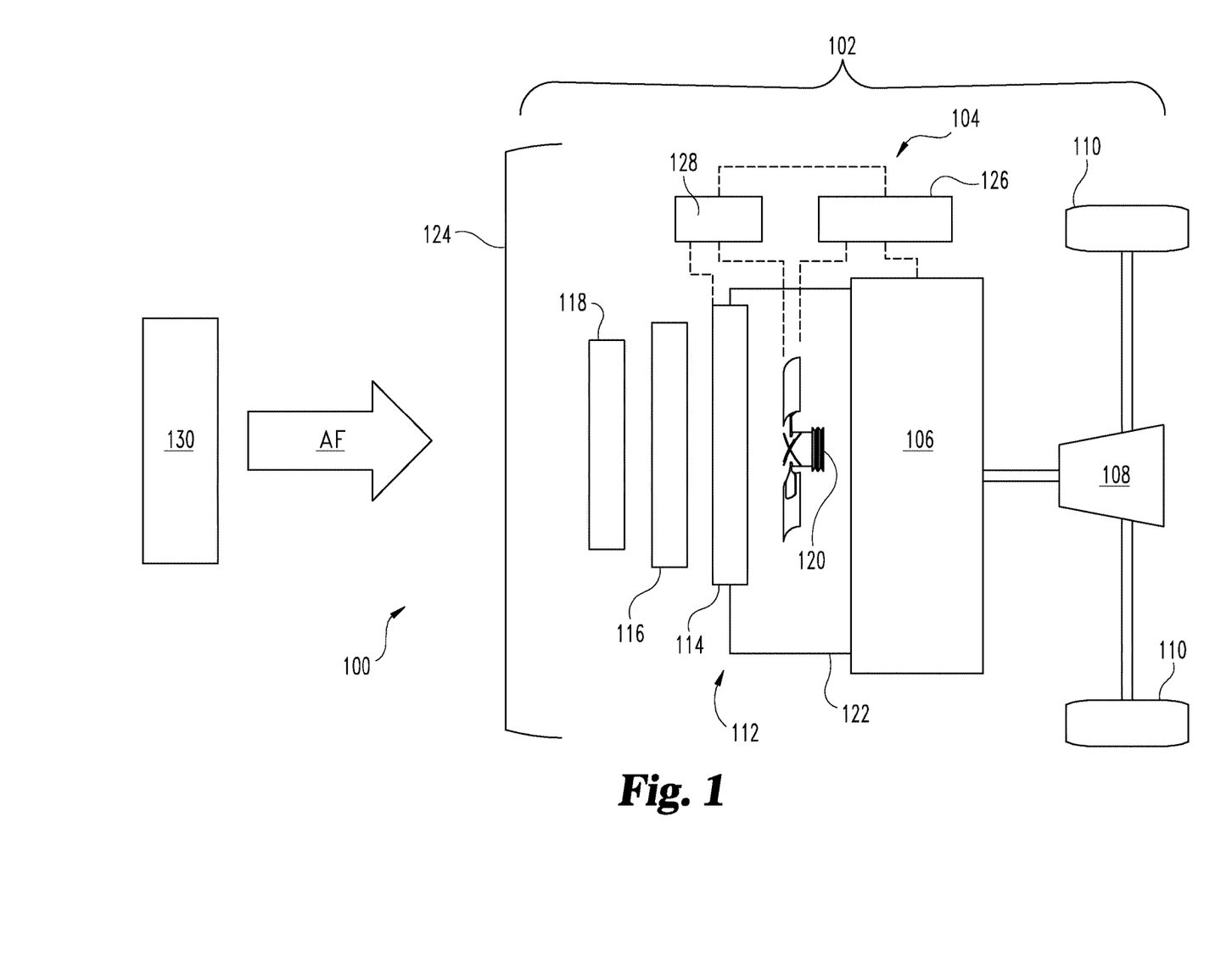
FIG. 1 is a schematic diagram illustrating certain aspects of an exemplary system.

With reference to FIG. 1, there is schematically illustrated a diagram of a system 100 including a vehicle 102 and a control system 104, the vehicle having a prime mover 106. The prime mover 106 may be or comprise any power source, such as an internal combustion engine, a hybrid engine, an electric motor, a battery, or a fuel cell. The prime mover 106 of the vehicle 102 may be operated in different vehicle propulsion modes so that the prime mover 106 provides torque to a transmission 108 which, in turn, provides torque to the drive wheels 110 of the vehicle 102 to cause movement of the vehicle in a direction.

The vehicle may include a cooling system 112 that may include a radiator 114, a charge air cooler 116, an air condenser 118, as well as different oil coolers, etc. The cooling system 112 includes a fan 120, and a coolant path 122. In an embodiment, the radiator 114 and the cooling fan 120 are operable to transfer heat to ambient from coolant inside the closed-loop coolant path 122. The fan 120 may preferably be a conventional cooling fan that may be controlled to drive air rearwardly from a frontal area 124 of the vehicle 102.

The cooling system 112 may include one or more coolant pumps (not shown) that are driven by operation of prime mover 106. Cooling flowpath 122 is in thermal communication with prime mover 106. In exemplary embodiments thermal communication is provided by portions of the coolant flowpath 122 passing through one or more flow passages provided in prime mover 106.

A frontal area 124 of the vehicle 102 encounters ambient air as the vehicle moves in a forward direction (toward the left side of FIG. 1), and the force of the air flow, represented by arrow AF in FIG. 1, exerts aerodynamic pressure on the moving vehicle 102 causing resistance to the forward vehicle movement. The prime mover 106 provides power to the vehicle 102 to overcome this aerodynamic resistance.

Thus, lowering aerodynamic resistance will help in improving fuel efficiency of overall vehicle. The frontal area 124 may include a grille through which some of the ambient air may pass as the vehicle moves forward, to reach the fan 120. Ambient air may be still relative to the ground, or may be moving in a wind direction. A wind direction may be parallel to a direction of forward movement of the vehicle or may be at a wind angle (wind attack angle or yaw) relative to the direction of forward movement of the vehicle, or relative to a longitudinal axis of the vehicle 102.

The vehicle 102 is controlled by a control system 104 structured to perform certain operations. The control system 104 is schematically represented in FIG. 1. The control system 104 may be an electronic control system. The electronic control system may include onboard and outboard systems and components operably coupled to facilitate control of functions of the system 100 and/or the vehicle 102. Although in FIG. 1 the control system 104 is schematically represented as being an on-board system, it is understood that modules, systems, functions, and components of the control system 104 may be distributed among both on-board and remote systems and components of the control system 104 that may be operatively coupled by wireless connections or other remote means for communication of signals and commands among them. The control system 104 may, in an exemplary embodiment, include an onboard controller 126 structured and operably coupled to receive and interpret signals from other components of the system 100, as well as from other components and sensors 128 of the vehicle 102. The control system 104 may be structured and operably coupled to output signals to components of the system 100 and/or to the vehicle 102, including output to and control of various actuators of the vehicle 102 and its systems and components. Some of the various sensors 128 and actuators that may be employed are described in more detail below.

The control system 104, optionally via an onboard controller 126, controls operation of the cooling fan 120 of the vehicle 102, which may be accomplished by sending by the control system 104 of signals to a motor of the fan 120 and/or to a fan control mechanism (not shown) that engages with the axle of the fan 120 to control the rotation of the fan and hence the movement of the fan blades. Such control may be exercised independently of the speed of operation of the prime mover 106. The states of operation of the cooling fan may include braked; free-rotation; or driven. The states of operation of the fan may be controlled via the control system 104 directing the operation of a mechanical fan clutch mechanism, which may engage the axis of the fan 120 for operation in such states.

In the braked state of the fan 120, a braking torque is applied to the fan 120, optionally through action of the fan control mechanism embodied as a fan clutch, so that rotation of the fan is prevented. In the braked operating mode of the fan, ambient air passing through the fan blades during movement of the vehicle cannot cause rotation of the fan 120.

In the driven state of the fan 120, the fan 120 is rotated around its axis by application of power from a component of the vehicle 102, which may include mechanical power by reason of mechanical coupling with the prime mover 106, or may include electrical power supplied by electrical power sources in the vehicle 102, such as a battery or a generator (not shown), in which case the fan 120 is decoupled from the prime mover 106 such that driving force is applied by electrical power and not the mechanical drive power of the prime mover 106. In any case, a fan clutch mechanism may be controlled by the control system 104 and operatively engaged to control the speed of rotation of the axle of the fan 120. In an exemplary embodiment, the speed of fan rotation may be controlled at a plurality of different selected rotational speeds (rotations per minute, rpm).

In the free-rotation state of the fan 120, the fan 120 is neither braked nor driven, and may be freely turned by the force of the ambient air acting on the fan blades while the vehicle 102 is in motion or has moving air impinging upon it. In typical vehicle operating conditions, a conventional moving vehicle typically has its cooling fan set in a braked mode or free-rotation operating mode.

In the driven state, the fan 120 may be controlled by the control system 104 to be driven at a particular rotational speed in order to satisfy operator demands or to meet operating parameters or settings of the vehicle 102. For example, the control system 104 may be set to control operation of the fan clutch mechanism to drive rotation of an axle of the fan 120 at a particular selected rotational speed. The speed of rotation of the fan may be controlled based on prime mover operating parameters such as prime mover cooling needs. For example, a higher fan speed may be commanded by the control system 104 to assist in lowering a component temperature of the prime mover 104, when such temperature is determined or estimated to exceed a temperature threshold.

The vehicle 102, system 100, and/or prime mover 106 may further include a number of sensors 128. Examples of such sensors may include sensors for detecting or estimating component temperatures, vehicle speed, vehicle ambient conditions, fuel consumption rates, and other pertinent data. It shall be appreciated that the foregoing sensors and sensor arrangements are but several non-limiting, illustrative embodiments of sensors and sensor systems to which the principles and techniques disclosed herein may be applied. It shall further be appreciated that the sensors 128 which are utilized may be physical sensors, virtual sensors, estimators, and/or combinations thereto.

According to an aspect of the present invention, the determination of an optimized speed of rotation at which the control system 104 controls fan operation is accomplished using a dynamic control method or system to satisfy prime mover operational demands while maximizing fuel efficiency. The inventors have discovered that aerodynamic drag of the vehicle 102 may be reduced by operation of the cooling fan 120 during forward movement of the vehicle 102. Operation of the fan 120 during forward movement changes the air flow field around the frontal area 124 of the vehicle. The inventors have discovered that, for a given vehicle in given operating conditions, an optimized fan rotation speed may be determined, at which a maximum reduction in aerodynamic drag may be achieved with respect to the given vehicle 102. Operation of the fan at the determined optimized rotational speed in turn allows the work (horsepower) required to maintain a constant vehicle speed to be reduced. Accordingly, the optimized fan rotation speed thus determined may be selected as a setting for operation of the vehicle 102, so as to increase fuel efficiency of vehicle operation by decreasing horsepower demanded from operation of the prime mover 104.

Figure 2:
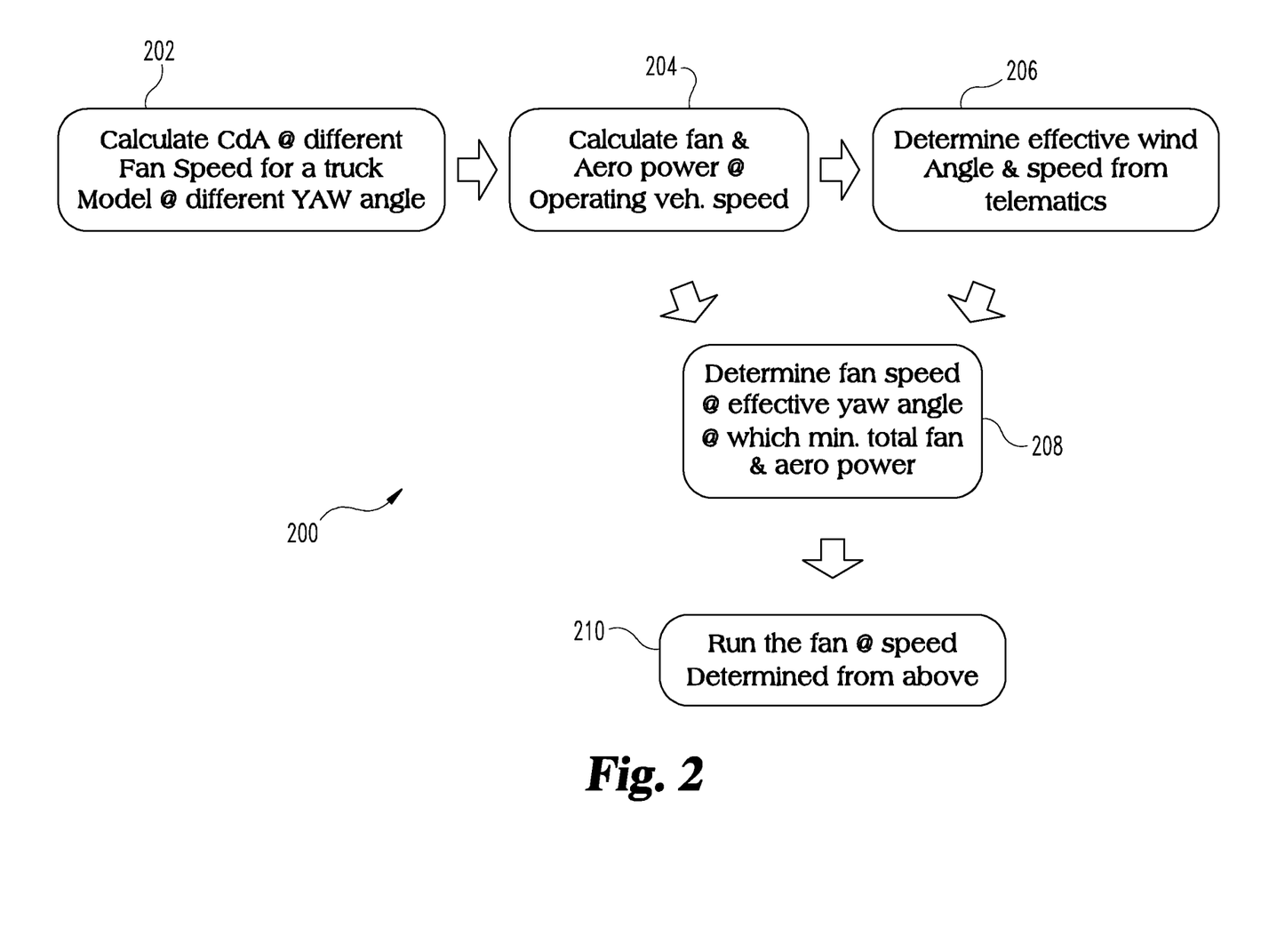
FIG. 2 is a flow diagram illustrating certain aspects of an exemplary process that can be performed in controlling an exemplary system in accord with FIG. 1.

FIG. 2 shows an overview of an embodiment of a system or process 200 including measuring flow dynamics of a vehicle in certain operating conditions to determine optimized cooling fan rotational speeds, in order to improve fuel efficiency of the vehicle operating under given operational parameters or demands. Process 200 starts at operation 202 to include a step of determining or calculating a value of an aerodynamic drag characteristic of the vehicle. The aerodynamic drag characteristic may preferably be the aerodynamic drag of the vehicle, which is a product of frontal area of the vehicle and aerodynamic resistance (CdA) of a given vehicle. The CdA calculation may be made by determining the drag coefficient of the vehicle in a given operating condition, and the frontal surface area of the vehicle.

In an exemplary embodiment, the determination of the CdA value at operation 202 may be made by utilizing a modeling system 130, as schematically represented in FIG. 1. For example, a method or system according to the invention may include use of a modeling system 130. The modeling system 130 may comprise devices and systems for performing three dimensional computational flow dynamics modeling processes, to determine a coefficient of drag Cd value for a given vehicle 102 in a given operating condition, which may then be multiplied by a measured or known frontal surface area value A for the given vehicle 102 to yield values of aerodynamic drag CdA. The process at operation 202 may include conducting tests to generate model data in a test environment representing the aerodynamic drag characteristics of the given vehicle 102 under certain operating conditions or parameters.

In an example, the operation 202 of FIG. 2 may include exposing a sample vehicle 102 such as a truck of a given make, model, and year to air flow in a test chamber of a system designed to measure flow dynamics and generate a data set representing the Cd characteristics of the vehicle 102 under set test conditions, such as a vehicle aerodynamics wind tunnel. The test conditions may preferably be variable, to allow testers to expose the vehicle to different conditions representing varying operating conditions or parameters. In an example, a varying operating condition may include variable air flow rates to represent different vehicle speeds and/or different wind speeds and angles (YAW). For example, the wind speed may be varied so as to yield a CdA calculation that reflects movement of the vehicle at a given vehicle speed (vehicle ground speed in miles per hour, mph) into a wind traveling at a given speed impinging on the frontal area of the vehicle (e.g., reflecting operation against a headwind directed at a zero angle toward the frontal area of the vehicle at a wind speed in miles per hour, mph).

In an example of operation 202, the varied test conditions representing operating conditions may include variable air flow directions (e.g., differing yaw conditions), representing different angles at which wind or air flow AF impinges upon the vehicle 102, relative to the direction of a longitudinal or vertical axis of the vehicle 102, or relative to a direction of movement of the vehicle. In an example, wind angle may be determined as an angle formed on a horizontal plane between the longitudinal axis of the vehicle 102 and the axis of the wind direction approaching the frontal area 124 of the vehicle 102.

The varied test conditions at operation 202 are used to generate, compile, compare, and store data sets that may be used to calculate or estimate the coefficient of drag of the vehicle corresponding to a particular set of test conditions representing actual operating conditions. Iterations are repeated at varied test conditions to generate data sets corresponding to a series of different operating conditions, which preferably include operation in a series of wind speeds and wind angles.

The operation 202 of the system and method represented in FIG. 2 preferably comprises testing to compile data on the aerodynamic drag characteristics of the vehicle in a series of varied operating conditions as described above, while the fan 120 of the vehicle 102 is controlled to operate at a series of set rotational speeds of the fan 120. For example, the series of set fan rotation speeds may include a series of speeds selected from the range of zero to 700 rotations per minute (rpm). Iterations are repeated at the varied operating conditions (series of wind speeds and series of wind angles) to collect data sets showing aerodynamic drag characteristic values for the vehicle at each set of operating conditions, while the fan is set to rotate at each of a series of set rotational speeds. A computer system of the modeling system 130 may then be employed to record, compile, compare, and store the resulting data sets. The data sets may be stored and used by the computer system of the modeling system 130 and/or the control system 104 in further calculations and determinations, including creating tables representing data on the aerodynamic drag characteristics based on fan rotation speed.

In operation 202 of FIG. 2, iterative tests as described above may be repeated on a number of different sample vehicles of various makes, models, and years, to record, compile, compare, and store data sets of aerodynamic drag characteristics CdA pertaining to each sample vehicle. The data sets may be stored and used by the computer system of the modeling system 130 and/or the control system 104 in further calculations and determinations, including creating tables representing data on the aerodynamic drag characteristics for each particular make, model, and year of vehicle in a set of operating conditions, related to fan rotation speed. Alternatively or in addition to the test chamber process above, the test process may be conducted using different test methods, such as scaled model wind tunnel tests, to generate aerodynamic drag characteristic values in operation 202.

In operation 204 of FIG. 2, fan power demand and aerodynamic power demand required to overcome aerodynamic drag of the vehicle 102 at a given vehicle speed are calculated. The details of operation 204 are set forth in the description of FIG. 3 below.

In operation 206 of FIG. 2, the ambient conditions for a given vehicle in actual operation are determined. The actual ambient conditions may include, for example, values for one or more of an effective wind speed and an effective wind angle encountered by the vehicle in operation. Data on the actual ambient conditions may be determined by one or more sensors 128 provided on the vehicle 102, and/or may be provided via telematics systems, as shown in the example in operation 206 of FIG. 2.

The fan power demand values and aerodynamic power demand values found in operation 204 and the ambient conditions values found in operation 206 are utilized in operation 208 of FIG. 2. Such values may be input from data tables compiled and stored in operations 202 and 204, and from sensor or telematics data obtained from operation 206. Operation 208 includes determining and selecting a fan rotational speed based on the power demand values and ambient condition values. Details of calculations in this operation 208 are set forth below with respect to FIG. 3. The selection of fan speed may be made by consulting the compiled data tables to determine the fan rotational speed at which the sum of fan power demand and aerodynamic power demand is reduced, or preferably minimized, for the given operating conditions, such as the effective yaw angle as shown in operation 208. At operation 210, the rotational speed of the fan is controlled to be the selected speed at which the sum is reduced or minimized.

Figure 3:
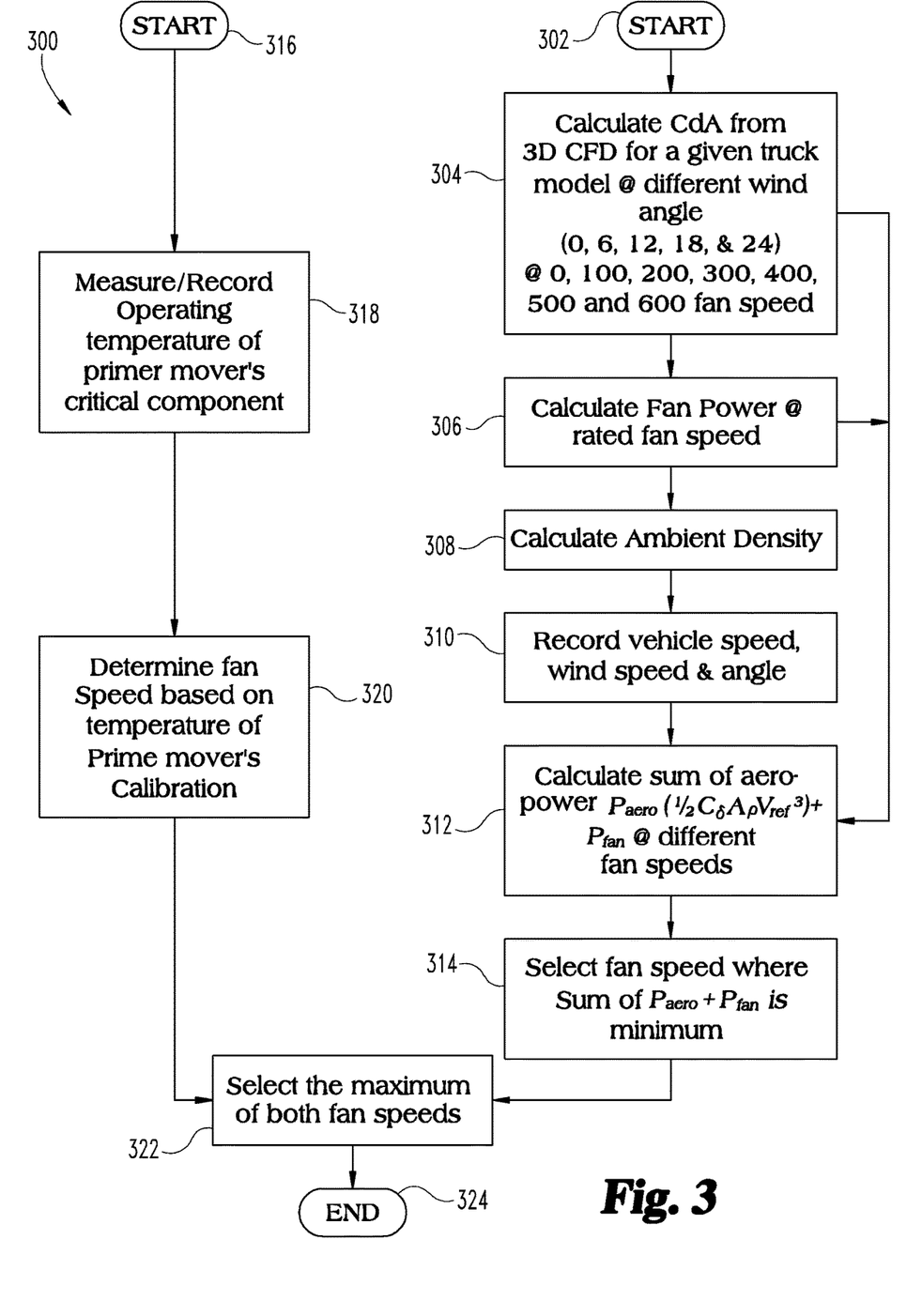
FIG. 3 is a flow diagram illustrating certain aspects of an exemplary process that can be performed in controlling an exemplary system in accord with FIG. 1.

In actual operation of a vehicle, it might be preferable to adjust the controlled rotational speed of the fan selected at operation 210 of FIG. 2, so that the fan speed is increased to address a demand of the vehicle, such as a cooling demand to reduce a temperature of a component of the prime mover of the vehicle (e.g., an intake manifold) when its temperature exceeds a threshold. FIG. 3 shows an embodiment of the system or method that includes determining optimized fan rotational speeds in a process 300 consistent with that of process 200, and further, including steps to adjust the controlled rotational speed of the fan based on given operational parameters or demands of the vehicle, such as a demand for cooling a component of a vehicle.

Procedure 300 of FIG. 3 starts at operation 302 to start the selection of fan speed to optimize aerodynamic drag. At operation 304, the method includes a step of calculating values of the aerodynamic drag (CdA) of a given vehicle in a series of given operational conditions using a three dimensional computational flow dynamics modeling method, consistent with the description set forth above with respect to operation 202 of FIG. 2. As in operation 202, to compile the data values, the series of tests are conducted in operation 304 with the fan controlled at a series of set fan rotational speeds and set operating conditions. In the example depicted in operation 304, given operating conditions include a series of set wind angles of 0, 6, 12, 18, and 24 degrees, which may be measured relative to the direction of forward movement of the vehicle, or relative to a longitudinal axis of the vehicle 102. The tests may be conducted with the fan rotational speed set at speeds of 0, 100, 200, 300, 400, 500, and 600 rpm. The resulting data sets may be stored and used by the computer system of the modeling system 130 and/or the control system 104 in further calculations and determinations, including creating tables representing data on the aerodynamic drag characteristics values CdA for each particular make, model, and year of vehicle in a set of operating conditions, related to fan rotation speed.

Operation 306 of FIG. 3 includes determining the fan power demand ($P_{fan}$) at a given fan rotational (operating) speed. Rated fan power demand ($P_{rated}$) of a given fan at a given fan operating speed is available from the respective fan manufacturer.

At operation 308, the ambient atmospheric density in the actual vehicle operating conditions may be determined or estimated in order to provide corrections to values of the fan power demand and the aerodynamic power demand of the vehicle. The ambient density may be determined or estimated based on data provided by sensors of the vehicle, and/or data obtained from telematics systems in communication with the controller of the vehicle.

At operation 310, values are determined or estimated for vehicle speed, wind speed at the location of vehicle operation, and the wind angle encountered by the vehicle at the location of operation. The values for these conditions may be determined or estimated based on data provided by sensors of the vehicle, vehicle operational settings, and/or data obtained from telematics systems in communication with the controller of the vehicle.

At operation 312, a sum of aerodynamic power demand of the vehicle and fan power demand at the actual operating conditions is calculated. The calculation includes estimating or determining a corrected fan power demand value ($P_{fan}$) at the operating conditions. The rated fan power demand value ($P_{rated}$) at a given rated fan speed may be corrected according to ambient density in the actual vehicle operating conditions, at the actual fan operating speed, using the formula:

$$P_{fan} = P_{rated} \times (\text{Fan Operating Speed/Fan Rated Speed})^3 \times (\text{Density @Operating Condition/Density @fan supplier test condition})$$

Operation 312 further includes calculation of the aerodynamic power demand value $P_{aero}$ of the vehicle at the operating conditions. The calculation utilizes the aerodynamic drag characteristic value CdA generated in operation 304 (similar to operation 202 of FIG. 2), and stored in memory, preferably in a table form to be consulted for the operation 312. The table may be consulted to determine the value based on the given vehicle model/make/year in the actual wind conditions.

$$P_{aero} = \tfrac{1}{2} \times \text{Density@Operating condition} \times C_d A \times V^3$$

Where:
$P_{aero}$: power needed to overcome aerodynamic drag (kW)
Density: ambient density in actual operating condition of vehicle (kg/m$^3$)
Cd: non-dimensional drag coefficient of vehicle
A: frontal area of vehicle (m$^2$)
V: velocity of air relative to vehicle (m/s)

At operation 314, the fan rotational speed is selected at which the sum of $P_{aero}+P_{fan}$ is reduced. Preferably, the fan rotational speed is selected at which the sum of $P_{aero}+P_{fan}$ is minimized.

At operation 316, an operation may be conducted to start an adjustment of the controlled rotational speed of the fan selected at operation 314, so that the fan speed is controlled to address a demand of the vehicle. For example, increased fan speed may be demanded to reduce a temperature of a component of the vehicle, for example, an intake manifold of a prime mover of the vehicle experiencing a temperature that exceeds a set threshold. At operation 318, a parameter of a component of the vehicle may be sensed. For example, the component's operating temperature may be sensed, determined, or estimated, and the temperature value may be recorded. For example, in the case of a prime mover that is a diesel engine, coolant temperatures and/or intake manifold temperatures may be determined.

At operation 320, one or more of the determined component parameters, such as temperatures, may be compared to the corresponding reference parameters, such as temperatures from reference tables stored in a memory of control system 104. The reference temperatures in the tables correspond to predetermined settings for fan rotational speeds based on the prime mover's calibration settings, and the predetermined fan speed setting is determined. At operation 322, the predetermined fan speed setting based on the reference temperature is compared to the fan speed that was selected at operation 314 for optimizing aerodynamic drag reduction. The higher of these two fan speeds is chosen as the selected fan speed, and the fan is controlled by the control system to operate at the selected fan speed, leading to an end of the procedure 300 at end operation 324.

Figure 4:
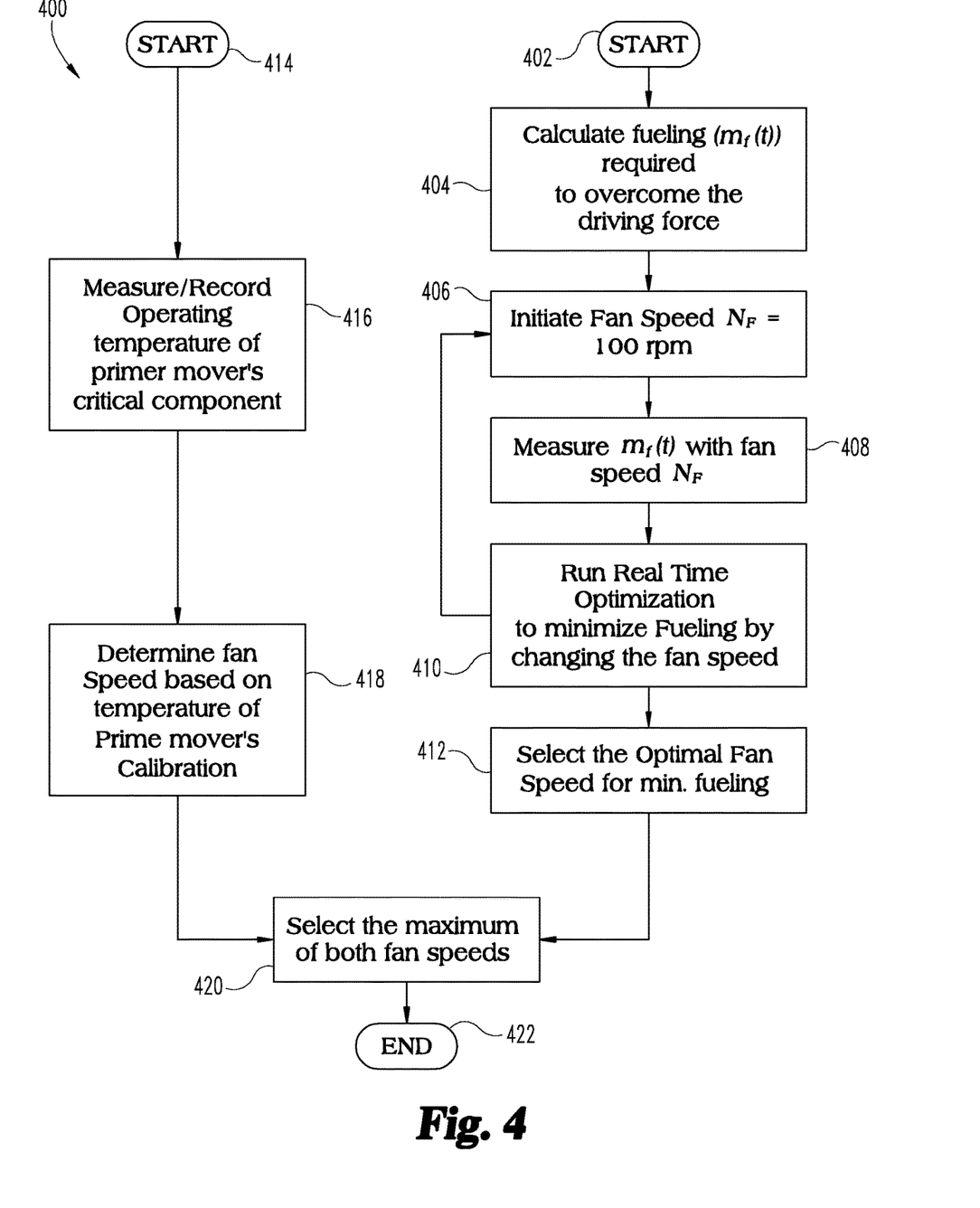
FIG. 4 is a flow diagram illustrating certain aspects of an exemplary process that can be performed in controlling an exemplary system.

Another illustrative embodiment of the method is schematically shown in the flow diagram of FIG. 4. This embodiment uses optimized selection of fan speed to achieve reduction of the overall vehicle power demand (for example, fueling demand in the case of a diesel engine) based on iterations of fan speed adjustments during actual operation of the vehicle. Data on fueling requirements of the vehicle associated with a particular fan rotational speed are used to select an optimized fan speed, at which overall power demand is reduced, or is minimized. The fan speed may be selected based on optimized fan speed for minimum power demand, or based upon a fan speed required to maintain an operational temperature limit in a manner consistent with operations 316 to 320 of FIG. 3 described above.

As seen in FIG. 4, an embodiment of procedure 400 includes a start at operation 402 to determine dynamic optimization of fan rotational speed for a vehicle in actual operation to reduce overall vehicle power demand. As in FIG. 3, the procedure is an embodiment of the inventors' discovery that, for a given vehicle in given operating conditions, an optimized fan rotation speed may be determined, at which a maximum reduction in aerodynamic drag may be achieved with respect to the given vehicle 102, offering a maximum reduction in fueling requirement with all other parameters held at a steady state. The procedure may include adjustment of the selected fan rotational speed as may be required to maintain vehicle operational demands, such as cooling demands.

At operation 404, the procedure 400 includes a step to calculate a fueling requirement or fueling demand of the vehicle. The fueling requirement may be determined or estimated as the mass of fuel per unit of time ($m_f(t)$) consumed by the prime mover in order to satisfy the vehicle's given set of operating parameters or demands. The operating parameters may include a set vehicle speed demand, controlled through a setting made by the operator of the vehicle, which requires overcoming a driving force. At operation 406, a step of initializing fan rotational speed $N_f$ is conducted. For example, an initial fan speed $N_1$ may be set to 100 rpm. At operation 408, a step is conducted to measure the fueling requirement $m_f(t)$ experienced with the fan speed set at the initial speed $N_1$.

At operation 410, a step is conducted to change the fan speed. This begins a series of iterations wherein other pertinent vehicle operating parameters are held at a steady state, while the fan is controlled to operate at a series of different set rotational speeds, allowing the measurement of the effect of the change of fan speed upon the fueling requirement $m_f(t)$. For example, holding all other operating parameters at a steady state, a fan speed is reduced by 10 rpm as shown in the repeat iteration from operation 410 to operation 406 (see arrow), so that the impact of the change in fan rotational speed upon the fueling requirement $m_f(t)$ may be measured. The adjustment to fan speed as a new iteration $N_2$ is conducted at step 406, and again, the fueling requirement is measured at step 408. Repeated cycles of runs $N_1$ to $N_x$ through steps 406 through 410 yields a data set that may be recorded and stored, showing fueling requirement as a function of fan speed. Reference to a table containing this compiled data allows selection of an optimized fan speed based on real-time optimization. Reference to the data set provides identification of the optimum fan speed for achieving a maximized reduction of the fueling requirement $m_f(t)$ with all other operating parameters held at a steady state. The optimized fan speed is selected at operation 412.

At operations 414 through 418, similarly to the process shown in FIG. 3 at operations 316 through 320 and described in detail above, optional steps may be conducted to adjust the optimized fan rotational speed to meet a particular vehicle operational demand. At operation 414 an operation may be conducted to start an adjustment of the controlled rotational speed of the fan selected at operation 412, so that the fan speed is increased to address a demand of the vehicle. For example, the demand may be a demand to reduce a temperature of a component of the vehicle. In the example shown in operation 416, the component's operating temperature may be sensed, determined, or estimated, and the temperature value may be recorded. At operation 418, the determined component temperature may be compared to the corresponding reference temperatures from reference tables stored in a memory of control system 104. The reference temperatures in the tables correspond to predetermined settings for fan rotational speeds based on the prime mover's calibration settings, and the predetermined fan speed is selected. At operation 420, the predetermined fan speed setting based on the reference temperature is compared to the fan speed that was selected at operation 412 for optimizing aerodynamic drag reduction. The higher of these two fan speeds is chosen as the selected fan speed, and the fan is controlled by the control system 104 to operate at the selected fan speed, leading to an end of the procedure 400 at end operation 422.

Figure 5:
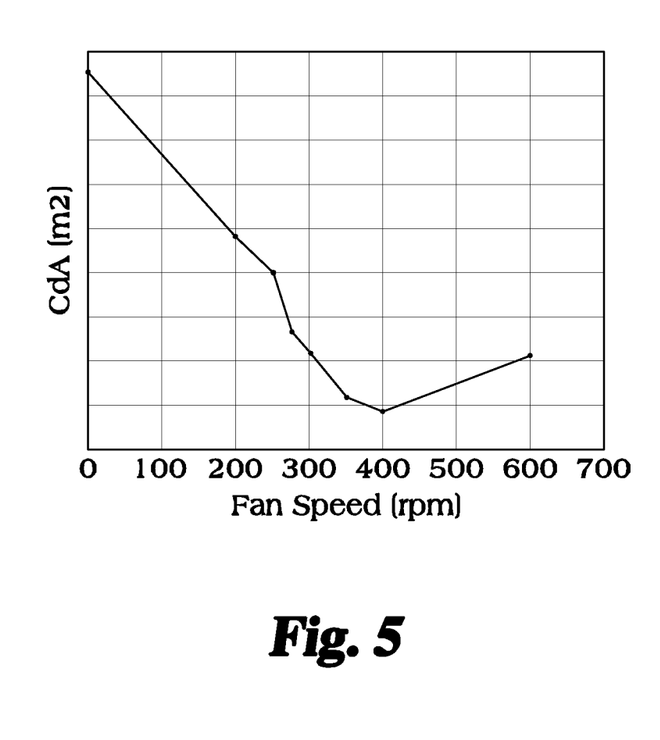
FIG. 5 is a chart illustrating certain aspects of reduction in vehicle aerodynamic drag in an exemplary system.
Figure 6A:
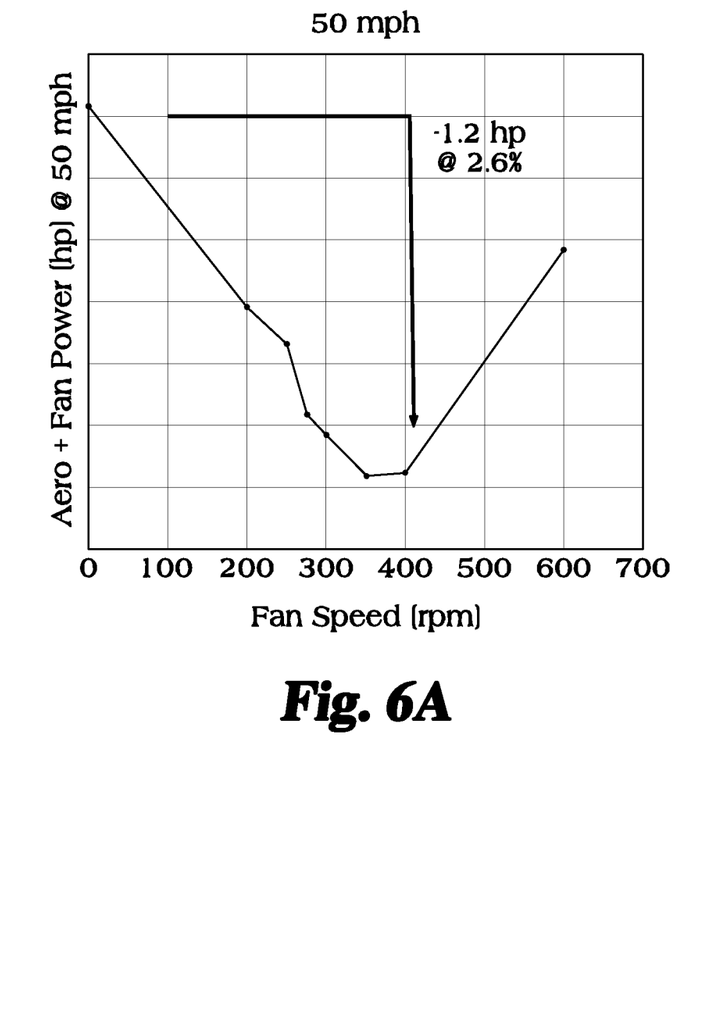
FIGS. 6A and 6B are charts illustrating certain aspects of reduction in work required to maintain vehicle speed in an exemplary system.
Figure 6B:
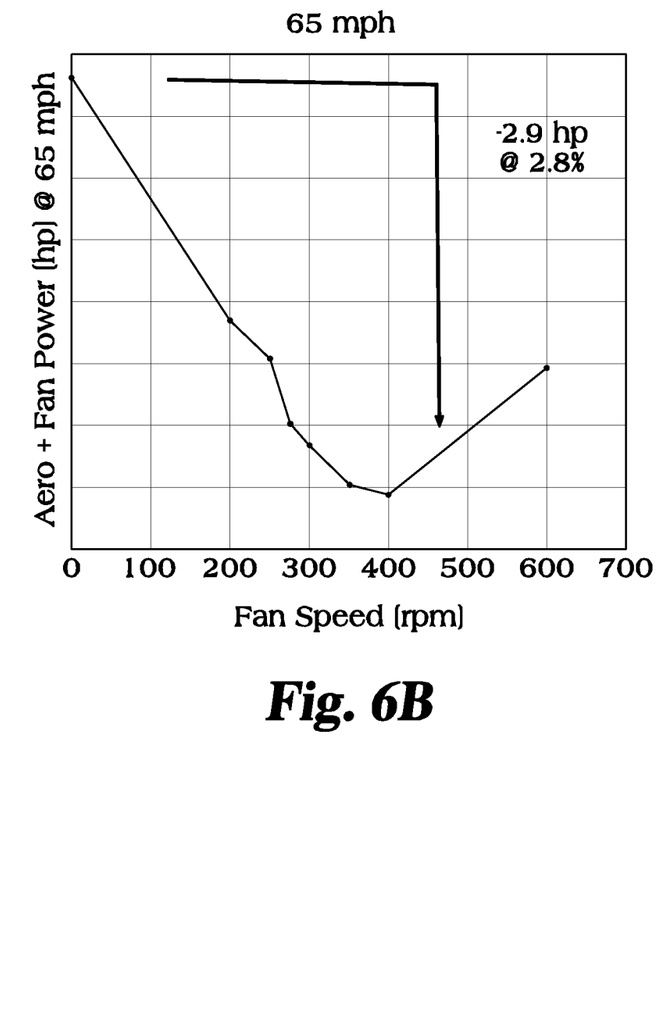

FIG. 5 shows exemplary data on drag reduction levels ($C_dA$ [$m^2$]) that have been found by the inventors, determined at a range of fan speeds (0-600 rpm) in accord with the optimization modeling procedure identified herein. FIGS. 6A and 6B show exemplary results achieved in use of fan speed optimization to achieve drag reduction resulting in lower vehicle power demand required to maintain a given vehicle speed. As represented in FIG. 6A, in a given vehicle set for operation at a vehicle speed of 50 mph, an optimized fan speed at approximately 350 rpm achieved a reduction of 1.2 horsepower in power demand required to maintain the vehicle speed of 50 mph. As represented in FIG. 6B, in a given vehicle set for operation at a vehicle speed of 65 mph, an optimized fan speed at approximately 400 rpm achieved a reduction of 2.9 horsepower in vehicle power demand required to maintain the vehicle speed of 65 mph as compared with power demand with zero fan speed.

With respect to the construction of the vehicle and apparatus disclosed herein, it shall be understood that the powertrain of vehicle 102 is an exemplary configuration and that additional embodiments contemplate other powertrain configurations including, for example, hybrid powertrain configurations, and that additional torque transfer devices for example, torque converters, gear splitters, differentials, deep reduction gears, and/or other devices may be included in the torque path between prime mover 106 and drive wheels 110 of the vehicle 102.

The vehicle 102 may be of various configurations, such as a tractor-trailer truck configuration. The truck may have a U.S. style conventional cab arrangement, or a cab over engine arrangement (e.g., conventional in Europe or China).

The control system 104 may be operatively coupled with and structured to store instructions in memory which are readable and executable by the control system 104 to operate the fan 120 or other components of the vehicle. It shall be appreciated that the control system 104, or a control module performing control functions as described herein, may be provided in a variety of forms and configurations including one or more computing devices forming a whole or part of a processing subsystem having non-transitory memory storing computer executable instructions, processing, and communication hardware. The control system 104 may be a single device or a distributed device, and the functions of the control system 104 may be performed by hardware or instructions encoded on a computer readable medium.

The control system 104 includes stored data values, constants, and functions, as well as operating instructions stored on computer readable medium. Any of the operations of exemplary procedures described herein may be performed at least partially by the control system 104. Other groupings that execute similar overall operations are understood within the scope of the present application. Modules may be implemented in hardware and/or software on one or more computer readable media, and modules may be distributed across various hardware or software components. More specific descriptions of certain embodiments of control system 104 operations are discussed herein in connection with the operations set forth in FIGS. 2 through 4. Operations illustrated are understood to be exemplary only, and operations may be combined or divided, and added or removed, as well as re-ordered in whole or in part.

Certain operations described herein include operations to interpret or determine one or more data points or parameters. Interpreting or determining, as utilized herein, includes receiving values by any method, including at least receiving values from a datalink or network communication, receiving an electronic signal (e.g., a voltage, frequency, current, or pulse-width modulation (PWM) signal) indicative of the value, receiving a software parameter indicative of the value, reading the value from a memory location on a computer readable medium, receiving the value as a runtime parameter by any means known in the art, and/or by receiving a value by which the interpreted or determined parameter can be calculated or estimated, and/or by referencing a default value that is interpreted or determined to be the parameter value.

Disclosed is a method comprising: determining an aerodynamic drag characteristic of a vehicle in an operating condition at a plurality of rotational speeds of a fan of the vehicle; determining a fan power demand at each of the plurality of rotational speeds; and controlling rotational speed of the fan to be a controlled speed at which a sum of an aerodynamic power demand of the vehicle and the fan power demand is reduced. The sum may be reduced to a minimum value for a given vehicle speed. The operating condition may include a wind angle, and the fan may be a cooling fan of a prime mover of the vehicle. The method may include a step of adjusting the controlled speed of the fan based on an operating parameter of the vehicle, and the operating parameter may be a cooling demand of the vehicle.

Also disclosed is a system comprising: a vehicle, a fan, and a control system structured to receive input signals from the vehicle and provide output signals to control fan speed. The control system may be structured to perform the acts of: determining an aerodynamic drag characteristic of the vehicle in an operating condition at a plurality of rotational speeds of the fan; determining a fan power demand at each of the plurality of rotational speeds; and controlling rotational speed of the fan to be a controlled speed at which a sum of an aerodynamic power demand of the vehicle and the fan power demand is reduced. The sum may be reduced to a minimum value for a given vehicle speed. The operating condition may include a wind angle, and the fan may be a cooling fan of a prime mover of the vehicle.

Also disclosed is a method comprising: operating a vehicle, the vehicle having a fan and a control system in operative communication with the vehicle and the fan to perform the acts of: repeatedly changing a rotational speed of the fan during operation of the vehicle at an operating parameter; determining fuel consumption values of the vehicle associated with the changed rotational speeds; predicting a future fuel consumption value at the operating parameter utilizing the determined fuel consumption values; selecting a rotational speed of the fan at which the predicted future fuel consumption value is reduced at the operating parameter; and controlling the fan to operate at the selected rotational speed during operation of the vehicle at the operating parameter. The operating parameter may include a vehicle speed. The fan may be a cooling fan of a prime mover of the vehicle. The method may include a step of adjusting the controlled speed of the fan based on a second operating parameter, and the second operating parameter may be a cooling demand of the vehicle.

Also disclosed is a system comprising: a vehicle, a fan, and a control system structured to receive input signals from the vehicle and provide output signals to control the vehicle and the fan. The control system may be structured to perform the acts of: repeatedly changing a rotational speed of the fan during operation of the vehicle at an operating parameter; determining fuel consumption values of the vehicle associated with the changed rotational speeds; predicting a future fuel consumption value at the operating parameter utilizing the determined fuel consumption values; selecting a rotational speed of the fan at which the predicted future fuel consumption value is reduced at the operating parameter; and controlling the fan to operate at the selected rotational speed during operation of the vehicle at the operating parameter. The operating parameter may be a vehicle speed, and the fan may be a cooling fan of a prime mover of the vehicle. The control system may adjust the controlled speed of the fan based on a cooling demand of the prime mover.

Also disclosed is an apparatus comprising: a vehicle, a fan, and a control system structured to receive input signals from the vehicle and provide output signals to control fan speed, the control system being structured to perform the acts of: repeatedly changing a rotational speed of the fan during operation of the vehicle at an operating parameter; determining fuel consumption values of the vehicle associated with the changed rotational speeds; predicting a future fuel consumption value at the operating parameter utilizing the determined fuel consumption values; selecting a rotational speed of the fan at which the predicted future fuel consumption value is reduced at the operating parameter; and controlling the fan to operate at the selected rotational speed during operation of the vehicle at the operating parameter.

One of skill in the art may appreciate from the foregoing that unexpected benefits are derived from application of the method, system, and apparatus to the problem of improving fuel efficiency in operating a conventional vehicle, without the need for additional components or parts, or changes in the configuration of a conventional vehicle or its features. Additional components and parts may add weight to a vehicle and thereby reduce fuel efficiency. Changes to configuration of a conventional vehicle may add costs and complexity to manufacture, operation, and maintenance of the vehicle. A key benefit contemplated by the inventors is improvement of fuel efficiency in a conventional vehicle through use of the disclosed dynamic fan speed control optimization system, method, or apparatus, while excluding any additional components, steps, or change in structural features. In this exclusion, maximum cost containment may be effected. Accordingly, the substantial benefits of simplicity of manufacture, operation, and maintenance of standard or conventionally produced vehicles as to which the method and system may be applied may reside in an embodiment of the invention consisting of or consisting essentially of the method, system, or apparatus disclosed herein. Thus, embodiments of the invention contemplate the exclusion of steps, features, parts, and components beyond those set forth herein. The inventors contemplate, in some embodiments, the exclusion of certain steps, features, parts, and components that are set forth in this disclosure even when such are identified as preferred or preferable.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected.

What is claimed is:

1. A method for reducing aerodynamic drag of a vehicle, comprising:
   determining an aerodynamic drag characteristic of the vehicle in an operating condition at a plurality of rotational speeds of a fan of the vehicle;
   determining a fan power demand at each of the plurality of rotational speeds; and
   controlling rotational speed of the fan to be a controlled speed at which a sum of an aerodynamic power demand of the vehicle and the fan power demand is reduced.

2. The method according to claim 1, wherein the operating condition comprises a wind angle.

3. The method according to claim 1, wherein the fan comprises a cooling fan of a prime mover of the vehicle.

4. The method according to claim 1, wherein the sum is reduced to a minimum value for a given vehicle speed.

5. The method according to claim 1, further comprising:
   adjusting the controlled speed of the fan based on an operating parameter of the vehicle.

6. The method according to claim 5, wherein the operating parameter comprises a cooling demand of the vehicle.

7. A system comprising:
   a vehicle, a fan, and a control system structured to receive input signals from the vehicle and provide output signals to control fan speed, the control system being configured to:
   determine an aerodynamic drag characteristic of the vehicle in an operating condition at a plurality of rotational speeds of the fan;
   determine a fan power demand at each of the plurality of rotational speeds; and
   control rotational speed of the fan to a controlled speed at which a sum of an aerodynamic power demand of the vehicle and the fan power demand is reduced.

8. The system according to claim 7, wherein the operating condition comprises a wind angle.

9. The system according to claim 7, wherein the fan comprises a cooling fan of a prime mover of the vehicle.

10. The system according to claim 7, wherein the sum is reduced to a minimum value for a given vehicle speed.

* * * * *